(12) United States Patent
Lurie et al.

(10) Patent No.: US 10,883,515 B2
(45) Date of Patent: Jan. 5, 2021

(54) METHOD AND SYSTEM FOR LEADING EDGE AUXILIARY VANES

(71) Applicant: General Electric Company, Schenectady, NY (US)

(72) Inventors: David Paul Lurie, Liberty Township, OH (US); Sherif Alykadry Abdelfattah, Mason, OH (US); Michael Julian Castillo, Liberty Township, OH (US); Anthony Louis DiPietro, Jr., Maineville, OH (US); Aspi Rustom Wadia, Loveland, OH (US); Eric Andrew Falk, Liberty Township, OH (US); William Joseph Solomon, Montgomery, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 358 days.

(21) Appl. No.: 15/601,674

(22) Filed: May 22, 2017

(65) Prior Publication Data
US 2018/0335051 A1    Nov. 22, 2018

(51) Int. Cl.
F01D 5/14    (2006.01)
F04D 29/54   (2006.01)
F01D 9/04    (2006.01)

(52) U.S. Cl.
CPC ........... F04D 29/542 (2013.01); F01D 5/146 (2013.01); F01D 9/041 (2013.01); F05D 2240/129 (2013.01)

(58) Field of Classification Search
CPC . F01D 5/14; F01D 5/143; F01D 5/145; F01D 5/146; F01D 5/147; F01D 5/148;
(Continued)

(56) References Cited

U.S. PATENT DOCUMENTS 3,692,425 A    9/1972  Erwin
4,512,718 A    4/1985  Stargardter
(Continued)

FOREIGN PATENT DOCUMENTS

EP    2806102    11/2014
GB    1198515    1/1970
JP    S60142004  7/1985

OTHER PUBLICATIONS

Joslyn, H. David, and Robert P. Dring. "Negative Incidence Flow Over a Turbine Rotor Blade." In ASME 1983 International Gas Turbine Conference and Exhibit, pp. V001T01A011-V001T01A011. American Society of Mechanical Engineers, 1983.
(Continued)

*Primary Examiner* — Courtney D Heinle
*Assistant Examiner* — Sang K Kim
(74) *Attorney, Agent, or Firm* — General Electric; Pamela Kachur (57) ABSTRACT

An apparatus and method of managing negative incidence of an airfoil are provided. The apparatus includes a row of vane pairs including a first row of main vanes extending radially inwardly from a stationary casing member and spaced circumferentially about a first axial location of the stationary casing member. The apparatus also includes a second row of auxiliary vanes extending radially inwardly from the stationary casing member and spaced circumferentially about a second axial location of the stationary casing member. The apparatus also includes a flow channel defined between a pressure side of each auxiliary vane and a suction side of an adjacent main vane proximate a leading edge of the adjacent main vane.

19 Claims, 4 Drawing Sheets

(58) Field of Classification Search
CPC ... F01D 9/041; F04D 29/542; F05D 2240/129
See application file for complete search history.

(56) References Cited

U.S. PATENT DOCUMENTS

| | | | |
|---|---|---|---|
| 5,470,200 | A | 11/1995 | Tupov et al. |
| 6,715,983 | B2 | 4/2004 | Koshoffer et al. |
| 7,841,828 | B2 | 11/2010 | Liang |
| 7,887,297 | B2 | 2/2011 | Allen-Bradley et al. |
| 8,342,803 | B2 | 1/2013 | Grohens et al. |
| 8,403,645 | B2 | 3/2013 | Barnes et al. |
| 8,459,956 | B2 | 6/2013 | Pandey et al. |
| 8,534,997 | B2 * | 9/2013 | Guemmer ............... F01D 5/146 415/181 |
| 8,727,725 | B1 | 5/2014 | Liang |
| 8,757,965 | B2 | 6/2014 | Baralon |
| 9,103,213 | B2 | 8/2015 | Barr et al. |
| 9,739,154 | B2 | 8/2017 | Derclaye et al. |
| 9,810,082 | B2 | 11/2017 | Calza |
| 2006/0133930 | A1 | 6/2006 | Aggarwala et al. |
| 2011/0318172 | A1 * | 12/2011 | Hoeger ................. F01D 5/142 415/181 |
| 2013/0058776 | A1 | 3/2013 | Domereq et al. |
| 2013/0209223 | A1 * | 8/2013 | Gomez ..................... F01D 1/04 415/68 |
| 2013/0224027 | A1 | 8/2013 | Barr et al. |
| 2014/0314549 | A1 * | 10/2014 | Pakkala ................... F01D 9/02 415/148 |
| 2014/0328675 | A1 * | 11/2014 | Derclaye ................ F01D 5/142 415/194 |
| 2014/0348660 | A1 | 11/2014 | Guendogdu et al. |
| 2015/0240648 | A1 * | 8/2015 | Guemmer ............... F01D 5/143 416/200 R |
| 2016/0215694 | A1 | 7/2016 | Brostmeyer et al. |
| 2018/0306041 | A1 * | 10/2018 | Peters ..................... F01D 9/041 |
| 2018/0334916 | A1 | 11/2018 | Lurie et al. |

OTHER PUBLICATIONS

Schneider, Tim, and Dragan Kožulović. "Flow characteristics of axial compressor tandem cascades at large off-design incidence angles." in ASME Turbo Expo 2013: Turbine Technical Conference and Exposition, pp. V06AT35A011-V06AT35A011. American Society of Mechanical Engineers, 2013.

Belamadi, Riyadh, Abdelouaheb Djemili, Adrian Ilinca, and Ramzi Mdouki. "Aerodynamic performance analysis of slotted airfoils for application to wind turbine blades." Journal of Wind Engineering and Industrial Aerodynamics 151(2016): 79-99.

Bai Tao, Research of Aerodynamic Performance of Turbine Blade with Different Loading Distribution at Wind Range Incidence, Journal of Ordanance Equipment Engineering, 2016, 163-167.

* cited by examiner

402 — CHANNELING A FLOW OF FLUID TO A ROW OF A PLURALITY OF AIRFOIL ASSEMBLIES, THE AIRFOIL ASSEMBLIES SPACED ABOUT A SURFACE OF A ROTATABLE MACHINE CASING, THE PLURALITY OF AIRFOIL ASSEMBLIES INCLUDING A ROW OF MAIN VANES INTERDIGITATED WITH A ROW OF AUXILIARY VANES

404 — CHANNELING AT LEAST A PORTION OF THE FLOW OF FLUID THROUGH A FLOW CHANNEL DEFINED BY A PRESSURE SIDE OF AN AUXILIARY VANE AND A SUCTION SIDE OF A RESPECTIVE MAIN VANE

FIG. 4

METHOD AND SYSTEM FOR LEADING EDGE AUXILIARY VANES

BACKGROUND

The field of the disclosure relates generally to rotatable machines and, more particularly, to a method and system for managing negative incidence in stationary vanes of compressors, axial compressors, outlet guide vanes, and military style fans using auxiliary vanes axially offset from the main vanes.

At least some known stationary vanes of rotatable machines, such as, compressors, axial compressors, outlet guide vanes, and military engine style fans, experience large incidence swings in early stages of the compressors, outlet guide vanes, and military style fans. During the wide range of operational conditions, vanes may operate at negative incidence, which can result in highly three dimensional separated flows on the pressure surface of the vanes.

One result of operating at a negative incidence or operating at a negative incidence that exceeds a certain threshold is a bluff body type separation of the flow from the surface of the airfoil. Such separation may introduce an undesirable vibratory mode to the airfoil or downstream airfoils. Additionally, the separation may cause a significant loss in compressor, turbine and/or engine overall performance. The operation of the vanes in these conditions can result in conditions that could adversely affect engine performance, efficiency, and/or operability or could shorten the life expectancy of components in the affected rotatable machines.

BRIEF DESCRIPTION

In one aspect, a row of airfoil vane pairs includes a first row of main vanes extending radially inwardly from a stationary casing member and spaced circumferentially about a first axial location of the stationary casing member. Each main vane of the first row of main vanes includes a vane root coupled to the stationary casing member, a distal tip end, and a main airfoil extending therebetween. The airfoil includes a first height from the stationary casing member to the distal tip end, a chord length between a leading edge of the main airfoil and a trailing edge of the main airfoil, and a thickness. The row of airfoil vane pairs also includes a second row of auxiliary vanes extending radially inwardly from the stationary casing member and spaced circumferentially about a second axial location of the stationary casing member, wherein the second axial location is different from the first axial location. Each auxiliary vane of the second row of auxiliary vanes includes an auxiliary vane root coupled to the stationary casing member, a distal tip end, and an auxiliary airfoil extending therebetween. The auxiliary airfoil includes a second height from the stationary casing member to the distal tip end, a chord length between an auxiliary airfoil leading edge and an auxiliary airfoil trailing edge, and a thickness. The row of airfoil vane pairs further includes a flow channel defined between a pressure side of an auxiliary vane and a suction side of an adjacent main vane proximate the adjacent main vane leading edge.

Optionally, the flow channel extends between the pressure side of the auxiliary vane of the second row of auxiliary vanes and the suction side of the adjacent main vane of the first row of main vanes from the leading edge of the main airfoil to the trailing edge of the auxiliary airfoil. Also optionally, the flow channel extends between the pressure side of the auxiliary vane of the second row of auxiliary vanes and the suction side of the main vane of the first row of main vanes from the leading edge of the main airfoil to a point forward of a local maximum thickness of the main airfoil. The leading edge of the auxiliary airfoil may be positioned axially forward of the leading edge of the main airfoil. The stationary casing member may include a rotor assembly that includes at least one of a high pressure compressor rotor assembly, a high pressure turbine rotor assembly, a fan assembly, and a low pressure turbine. The row of airfoil vane pairs may form a later stage of a compressor. Optionally, the second height may be approximately equal to the first height and/or the second height may be less than the first height.

In another aspect, a method of managing negative incidence of a vane includes channeling a flow of fluid to a row of a plurality of airfoil assemblies, wherein the plurality of airfoil assemblies are spaced about a surface of a stationary casing member. The plurality of airfoil assemblies includes a row of main vanes interdigitated with a row of auxiliary vanes. The method also includes channeling at least a portion of the flow of fluid through a flow channel defined by a pressure side of an auxiliary vane of the row of auxiliary vanes and a suction side of a respective main vane of the row of main vanes.

Optionally, the method further includes channeling the flow of fluid along the pressure side of the auxiliary vane before the flow of fluid enters the flow channel. Also optionally, the method may include maintaining a predetermined angle of incidence on the main vanes using the flow of fluid. The method may also include maintaining an angle of incidence on the main vanes less than or equal to sixty degrees using the flow of fluid. Optionally, the method may also include maintaining an angle of incidence on the main vanes less than or equal to twenty degrees using the flow of fluid. The method may also include maintaining a non-negative angle of incidence on the main vanes using the flow of fluid.

In yet another aspect, a rotatable machine includes a rotor assembly that includes one or more bladed members coupled through a shaft rotatable about a longitudinal axis and a stationary casing member at least partially surrounding the rotor assembly. A plurality of vane pairs are spaced circumferentially about a first axial location of at least one of the stationary casing and the rotor assembly. Each of a main vane and an adjacent auxiliary vane of the plurality of vane pairs includes a leading edge, a trailing edge, and an airfoil body extending therebetween. Each airfoil body includes a suction side and an opposing pressure side. The plurality of vane pairs includes a flow channel defined between a pressure side of the airfoil body of the adjacent auxiliary vane and a suction side of the airfoil body of the main vane proximate the main vane leading edge.

Optionally, the flow channel extends between the pressure side of the auxiliary vane airfoil body and the suction side of the main vane airfoil body from the main vane leading edge to the auxiliary vane trailing edge. Also optionally, the flow channel extends between the pressure side of the auxiliary vane airfoil body and the suction side of the main vane airfoil body from the main vane leading edge to a point forward of a local maximum thickness of the main vane airfoil body. The leading edge of the main vane may be positioned axially forward of the leading edge of the adjacent auxiliary vane. The rotor assembly may include at least one of a high pressure compressor, a high pressure turbine, a fan assembly, and a low pressure turbine. Optionally, the plurality of vane pairs form a later stage of a compressor.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extends substantially parallel to a centerline of the turbine engine. Moreover, the terms "radial" and "radially" refer to directions and orientations that extends substantially perpendicular to the centerline of the turbine engine. In addition, as used herein, the terms "circumferential" and "circumferentially" refer to directions and orientations that extend arcuately about the centerline of the turbine engine.

As used herein, the term airfoils refers to both blades typically found on rotatable members, such as, but not limited to, rotors of machines and to stationary vanes typically found on, for example, casings of machines. In some instances, airfoils, blades, and vanes may be used interchangeably. Additionally, although some reference may be made to rotor blades the present disclosure is applicable to stator or stationary vanes as well. In some embodiments, the stator vanes may be shrouded, in that the tips of the vanes are ganged together or coupled together by a shroud. The shroud may gang the radially inner tips of vanes that extend from the casing or from a radially outer ring coupled to the casing. The radially outer tips of vanes may be shrouded, in some embodiments.

Embodiments of the negative incidence management techniques described herein provide a cost-effective method for reducing mechanical excitation of the affected row of vanes and downstream rows of airfoils, such as, but not limited to, downstream stator vanes and downstream rotor blades, caused by bluff body type flow separation. Additionally, such techniques facilitate mitigating a reduced performance of the turbine, the compressor and/or the overall engine caused by the separation. Each row of vanes taking advantage of the negative incidence management techniques described herein includes a first row of main vanes and a second row of auxiliary vanes extending circumferentially about the rotor. In an exemplary embodiment, the auxiliary vanes are smaller than the main vanes and are positioned axially at least partially forward of the main vanes. The auxiliary vanes are interdigitated with the main vanes, such that main vanes and auxiliary vanes alternate circumferentially around the rotor. A flow channel is thereby formed between each pair of auxiliary vanes and main vanes. Specifically, the flow channel is formed between a pressure side of an auxiliary vane of the pair and a suction side of an adjacent main vane of the pair. The flow channel is configured to pull incoming flow around the auxiliary vane, between the auxiliary vane and main vane to prevent or reduce flow separation on the pressure side of the main vane.

The operating line on a compressor or turbine map relates the flow and pressure ratio for a given speed at which the respective machine operates. The operating line is generally set by the turbine nozzle area and the fuel flow temperatures across the combustor. Typically, during operation, the operating line is a fixed line that other component parameters are based on. As the operation of the compressor or turbine moves farther above the operating line, the compressor or turbine is operating closer to a stall condition. The compressor or turbine is designed to operate at approximately the operating line with a sufficient margin before the stall line. Typically, compressor or turbine operation does not move below the operating line. However, in a variable cycle engine, there may be a benefit to the overall cycle to operate significantly below the operating line, but such operation creates the negative incidence issue on, for example, the rear stages of the compressor or turbine.

Figure 1:
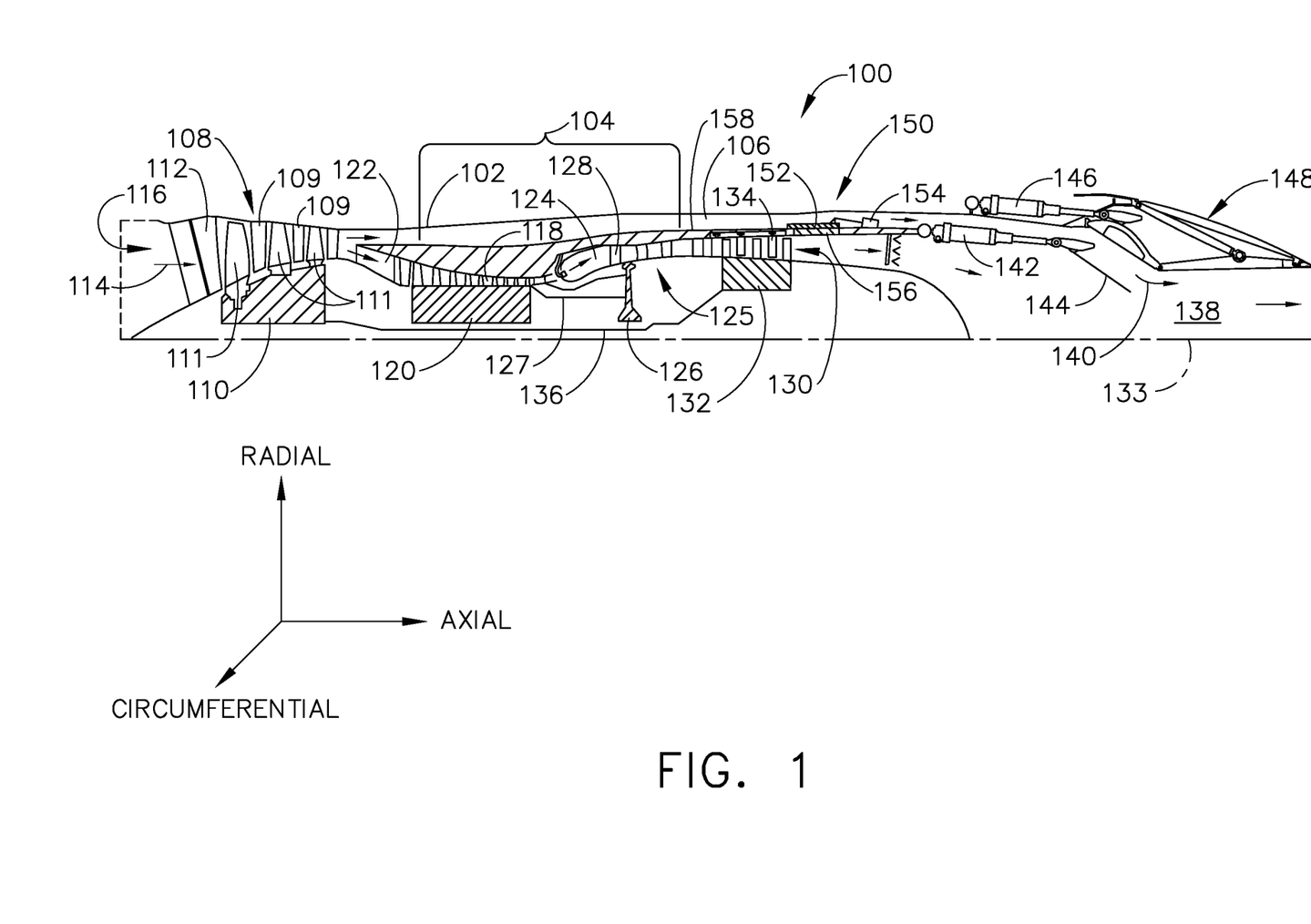
FIG. 1 is a cross-sectional view of a rotatable machine, such as, a military style gas turbine engine in accordance with an example embodiment of the present disclosure.

FIG. 1 is a cross-sectional view of a military style gas turbine engine 100 in accordance with an example embodiment of the present disclosure. Although described with reference to military style gas turbine engine 100, embodiments of the present disclosure are applicable to any rotatable machine having the components described herein. Military style gas turbine engine 100 can be an adaptive cycle or variable cycle gas turbine engine, or other rotatable machine. In the example embodiment, gas turbine engine 100 includes an outer casing 102 spaced apart from an inner core engine 104 so as to define an annular bypass duct 106 therebetween. Gas turbine engine 100 includes a fan assembly 108 having outlet guide and stator vanes 109, a three-stage rotor assembly 110, including rotor blades 111, and inlet guide vanes 112 disposed between rotor stages and extending radially inward from the outer casing 102. Fan assembly 108 receives an inlet airflow 114 from an inlet opening 116, and thereupon pressurizes inlet airflow 114, a portion of which is delivered to the core engine 104 and the remainder of which is directed to bypass duct 106. Inlet opening 116 is sized to accept a predetermined design airflow. Core engine 104 includes an axial flow high pressure compressor 118 having a high pressure compressor rotor assembly 120. Pressurized air entering high pressure compressor 118 through a flow annulus 122 is compressed and then discharged to a combustor 124 where fuel is burned to provide high energy combustion gases which drive a high pressure turbine 125 having a high pressure turbine rotor assembly 126. High pressure turbine rotor assembly 126 operates to extract kinetic energy from the high velocity core gas stream exiting combustor 124, and to convert this kinetic energy into torque for driving high pressure compressor rotor assembly 120 through a high pressure shaft 127. For the purpose of providing additional control of the core engine flow, variable pitch inlet guide vanes 128 may be provided upstream of turbine rotor assembly 126.

Disposed downstream of high pressure turbine 125, in a position to receive the flow of hot gases leaving core engine 104, is a low pressure turbine 130, sometimes referred to as a power turbine. Low pressure turbine 130 includes a low pressure turbine rotor assembly 132 and variable pitch inlet guide vane sections 134. While low pressure turbine rotor assembly 132 has been illustrated as comprising three stages, it will be apparent to those skilled in the art that a smaller or greater number of stages may be utilized depending upon the turbine energy extraction potential required. Inlet guide vane sections 134 operate to convert kinetic energy from the core stream into torque and to deliver this torque to low pressure turbine rotor assembly 132 which in turn drives low pressure turbine rotor assembly 132 through an upstream extending drive shaft 136 connected for rotation with rotor assemblies 110 and 132. High pressure shaft 127 and drive shaft 136 are rotatable about a longitudinal axis 133 of gas turbine engine 100.

The cross-sectional flow area to low pressure turbine rotor assembly 132 is varied by varying the pitch of variable inlet guide vane sections 134 which acts to vary the back pressure on high pressure turbine 125 and thereby control the high pressure turbine rotor speed. Propulsive force is obtained by the discharge of combustion gases from core engine 104 through a variable area core nozzle 138. Propulsive force is also obtained by the action of fan assembly 108 discharging air through variable area bypass nozzle 140 concentric to core nozzle 138. To assist in modulating the flow in bypass duct 106 and core engine 104, the area of bypass nozzle 140 and core nozzle 138 may be varied by a suitable variable geometry. As illustrated, the variable geometry may comprise a plurality of linear actuators 142 controlling hinged bypass nozzle flaps 144 and a second plurality of linear actuators 146 controlling a collapsible hinged wall assembly 148 to vary the cross-sectional area of core nozzle 138. Hinged flaps 144 may be moved to a closed position, wherein variable area bypass nozzle 140 is obtruded such as that no flow is exhausted therefrom.

Aft of the low pressure turbine 130 there is provided an annular diverter valve 150. Annular diverter valve 150 may comprise a hinged panel 152 under control of a linear actuator 154. Hinged panel 152 covers a plurality of vanes 156 in an inner casing 158 separating the bypass duct 106 and core engine 104, and which are curved to promote mixing of the core and bypass gas streams. In its open position, hinged panel 152 uncovers vanes 156, which permits the bypass flow to mix with the core stream. In its closed position, hinged panel 152 covers vanes 156 to prevent mixing of the core and bypass gas streams.

Annular diverter valve 150, in combination with the hinged flaps 144, are used to switch the basic engine mode of operation between a separated flow, high bypass, low thrust cycle, to a mixed flow, low bypass, high thrust static pressure balanced cycle.

Gas turbine engine 100 is depicted in the figures by way of example only, in other exemplary embodiments, gas turbine engine 100 may have any other suitable configuration including for example, variable cycle gas turbine engine, a turboprop engine, a turbofan engine, a turboshaft engine, a military purpose engine, and a marine or land-based aero-derivative engine.

Gas turbine engine 100 is suitable for use as an aircraft power plant. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, embodiments of the present disclosure are contemplated for utilization in other applications that may not be coupled with an aircraft such as, for example, industrial applications, power generation, pumping sets, naval propulsion, weapon systems, security systems, perimeter defense/security systems, and the like.

Although gas turbine engine 100 is shown as a single-spool, axial flow engine, other engine types and configurations are also possible. In one non-limiting example, high pressure compressor 118 can include a high pressure compressor and a low pressure compressor, and in some forms may include a mixed axial/centrifugal flow compressor. Furthermore, in some embodiments, gas turbine engine 100 can take the form of a turbofan, turboprop, turbojet, or turboshaft engine suitable for use as a power plant at a variety of flight conditions. Other variations and combinations of gas turbine engine 100 are also contemplated herein.

Figure 2:
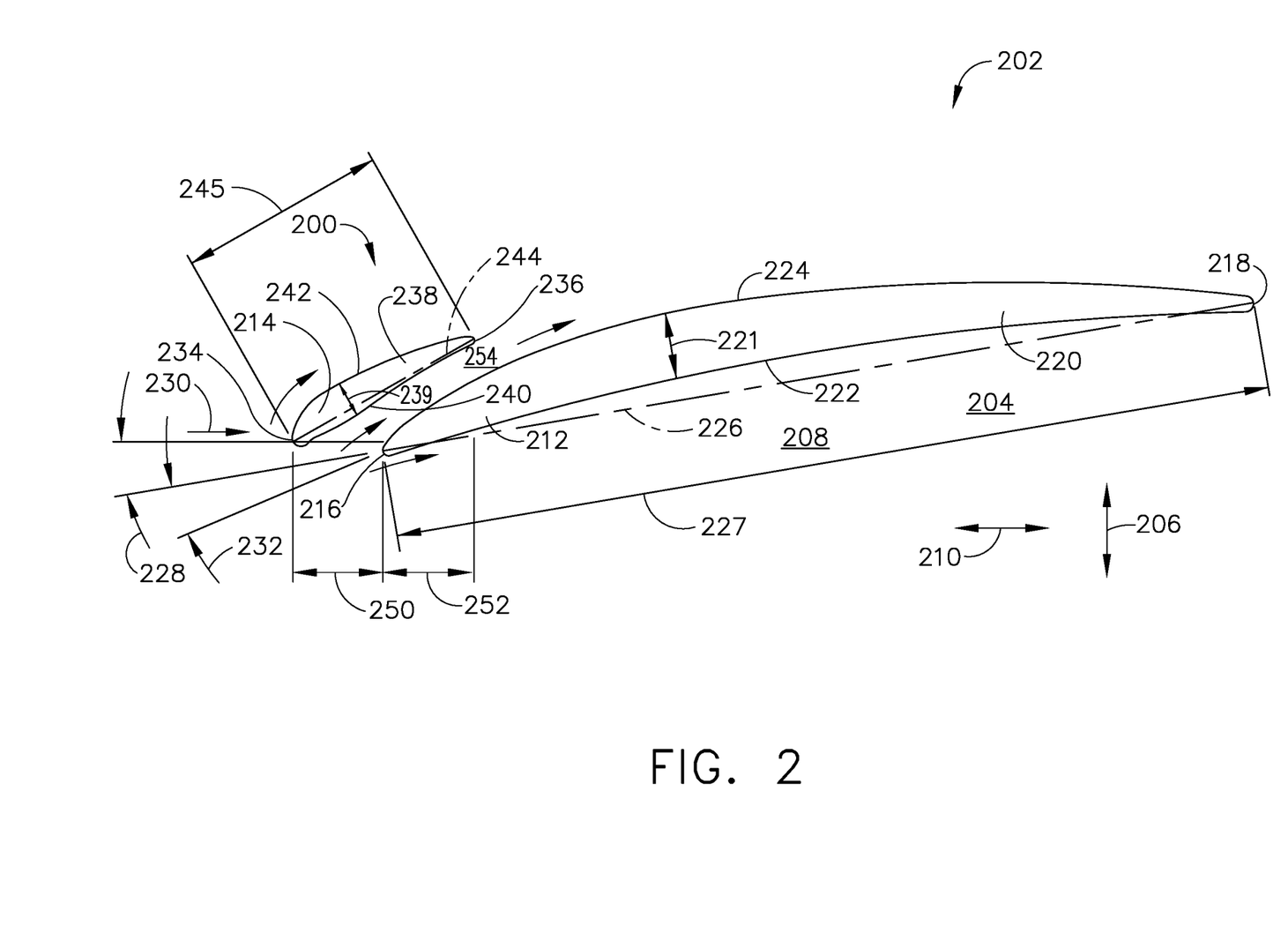
FIG. 2 is a plan view, looking radially inwardly, of a row of airfoil pairs in accordance with an example embodiment of the present disclosure.
Figure 3:
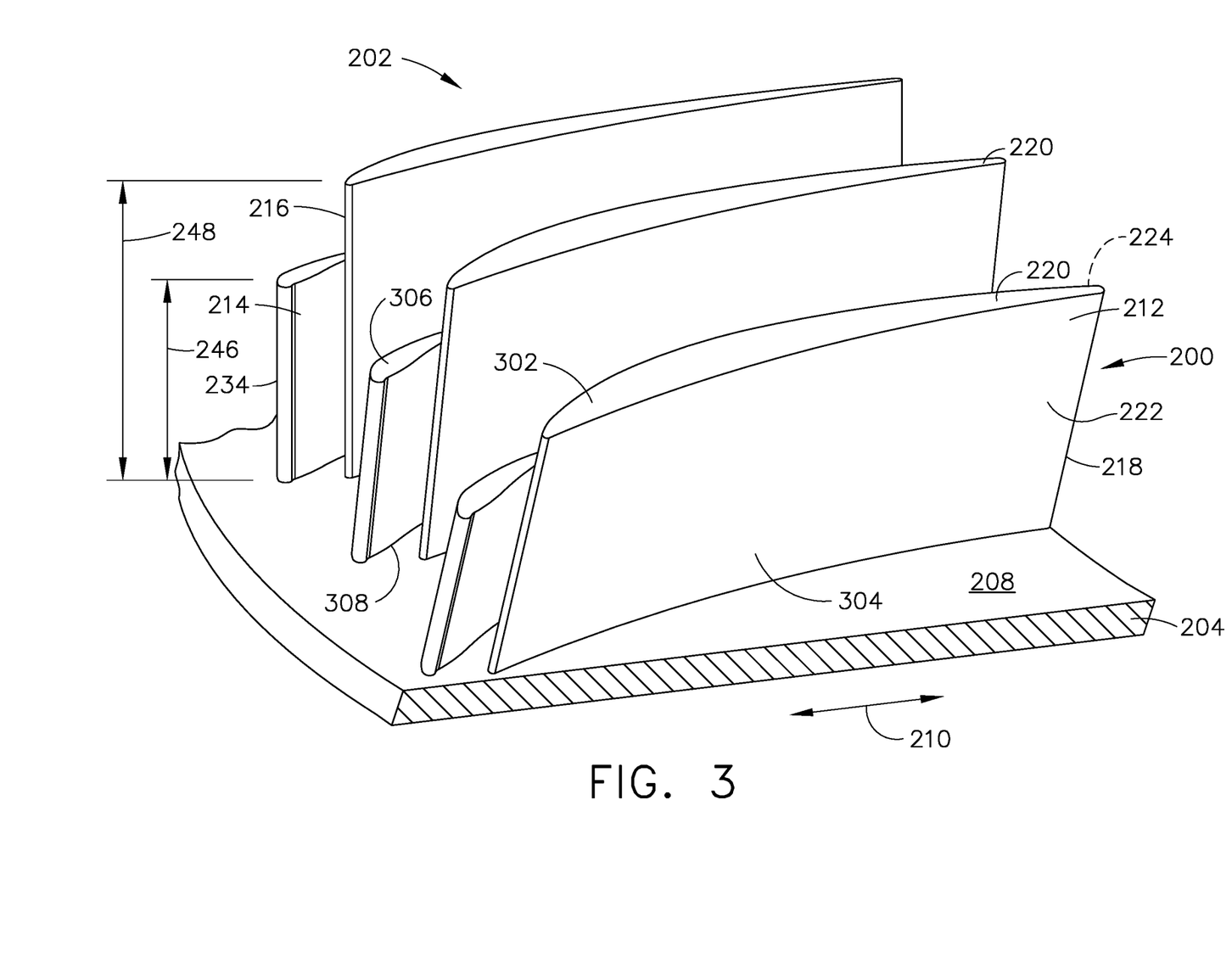
FIG. 3 is a perspective view of the row of airfoil pairs shown in FIG. 2.

FIG. 2 is a plan view, looking radially outwardly, of a row of airfoil vane pairs 200 in accordance with an example embodiment of the present disclosure. FIG. 3 is a perspective view of row of airfoil vane pairs 200. In the example embodiment, row of airfoil vane pairs 200 is a stationary row of airfoil vane pairs implemented in a stage 202 of a stationary casing member 204, such as, but not limited to, fan assembly 108, high pressure compressor 118, high pressure turbine 125, and/or low pressure turbine 130 (shown in FIG. 1). Row of airfoil vane pairs 200 extends in a circumferential direction 206 about a radially inner surface 208 of stationary casing member 204 at a predetermined range in an axial direction 210. Row of airfoil vane pairs 200 along with an associated row of rotor blades, if any, form stage 202. Row of airfoil vane pairs 200 includes a row of main vanes 212 interdigitated with a row of auxiliary vanes 214. Each main vane 212 includes a leading edge 216, a trailing edge 218, and a main vane airfoil body 220 extending approximately axially therebetween. Each main vane 212 also includes a main vane distal tip end 302, a main vane root 304, and main vane airfoil body 220 extending radially therebetween. A thickness 221 of main vane airfoil body 220 varies axially between leading edge 216 and trailing edge 218. Main vane 212 includes a pressure side 222 and a suction side 224. A chord line 226 extends between leading edge 216 and trailing edge 218 and defines a chord length 227. In one embodiment, an angle of incidence 228, 232 is defined as the angle between chord line 226 and a flow 230 entering stage 202. In the example embodiment, flow 230 is illustrated as a straight axial flow, however, flow 230 can vary angularly through the many operational conditions experienced by gas turbine engine 100. For example, changing incoming flow 230, can result in positive angle of incidence 228, as illustrated in FIG. 2, or negative angle of incidence 232. An excessive negative angle of incidence 232 can cause flow separation on pressure side 222, in which flow along pressure side 222 undergoes a separation of the flow from pressure side 222, for example, a bluff body separation of a laminar flow.

Each auxiliary vane 214 includes a leading edge 234, a trailing edge 236, and an auxiliary vane airfoil body 238 extending therebetween. Each auxiliary vane 214 also includes an auxiliary vane distal tip end 306, an auxiliary vane root 308, and auxiliary vane airfoil body 238 extending therebetween. A thickness 239 of airfoil body 238 varies axially between leading edge 234 and trailing edge 236. Auxiliary vane 214 includes a pressure side 240 and a suction side 242. A chord line 244 extends between leading edge 234 and trailing edge 236 and defines a chord length 245. In the example embodiment, as shown in FIG. 2, auxiliary vane 214 is dimensionally smaller than main vanes 212, in that chord line 244 is shorter than chord line 226. A second height 246 of auxiliary vane 214 is shorter than a first height 248 of main vanes 212. In alternative embodiments, auxiliary vane 214 is dimensionally larger than main vanes 212, in that chord line 244 is longer than chord line 226. In other alternative embodiments, chord line 226 and 244 are of equal length.

In the example embodiment, main vane 212 is positioned at a first axial location and auxiliary vane 214 is positioned at a second axial location that is different from the first axial location. More specifically, in the example embodiment, auxiliary vane 214 is positioned upstream from main vanes 212 by a first predetermined distance 250. Trailing edge 236 is spaced axially aftward from leading edge 216 a second predetermined distance 252. A flow channel 254 is defined along first predetermined distance 250 only by pressure side 240 and along second predetermined distance 252 by pressure side 240 and suction side 224.

A size and position of auxiliary vane 214 with respect to main vanes 212 defines a size and shape of flow channel 254. In the example embodiment, flow channel 254 extends between pressure side 240 and suction side 224 from leading edge 216 of main vane 212 to trailing edge 236 of auxiliary vane 214. Moreover, in the example embodiment, flow channel 254 extends between pressure side 240 and suction side 224 from leading edge 216 of main vane 212 to a position forward of a local maximum thickness 221 of main vane 212. Flow channel 254 is configured to maintain a more positive angle of incidence 228 than would otherwise occur in the absence of flow channel 254. Flow channel 254 redirects flow at leading edge 216 towards suction side 224 thereby facilitating maintaining a more positive angle of incidence 228. In alternative embodiments, flow channel 254 extends to any suitable extent that enables row of airfoil vane pairs 200 to function as described herein.

In some embodiments, flow channel 254 facilitates maintaining a predetermined angle of incidence 228 on main vanes 212. For example, flow channel 254 facilitates maintaining angle of incidence 228 at less than or equal to sixty degrees. For another example, flow channel 254 facilitates maintaining angle of incidence 228 at less than or equal to twenty degrees. For another example, flow channel 254 facilitates maintaining angle of incidence 228 at a non-negative angle. In alternative embodiments, flow channel 254 facilitates maintaining angle of incidence 228 at any suitable value.

Although illustrated and described primarily with reference to rows of vanes, for example, as used in rotatable machinery stators, the auxiliary airfoil concept also applies to rows of blades on a rotatable machine rotor. Additionally, the auxiliary airfoil concept applies to any stage of the machine including the first stage and later stages, as well as to guide vanes and fan vanes.

Figure 4:
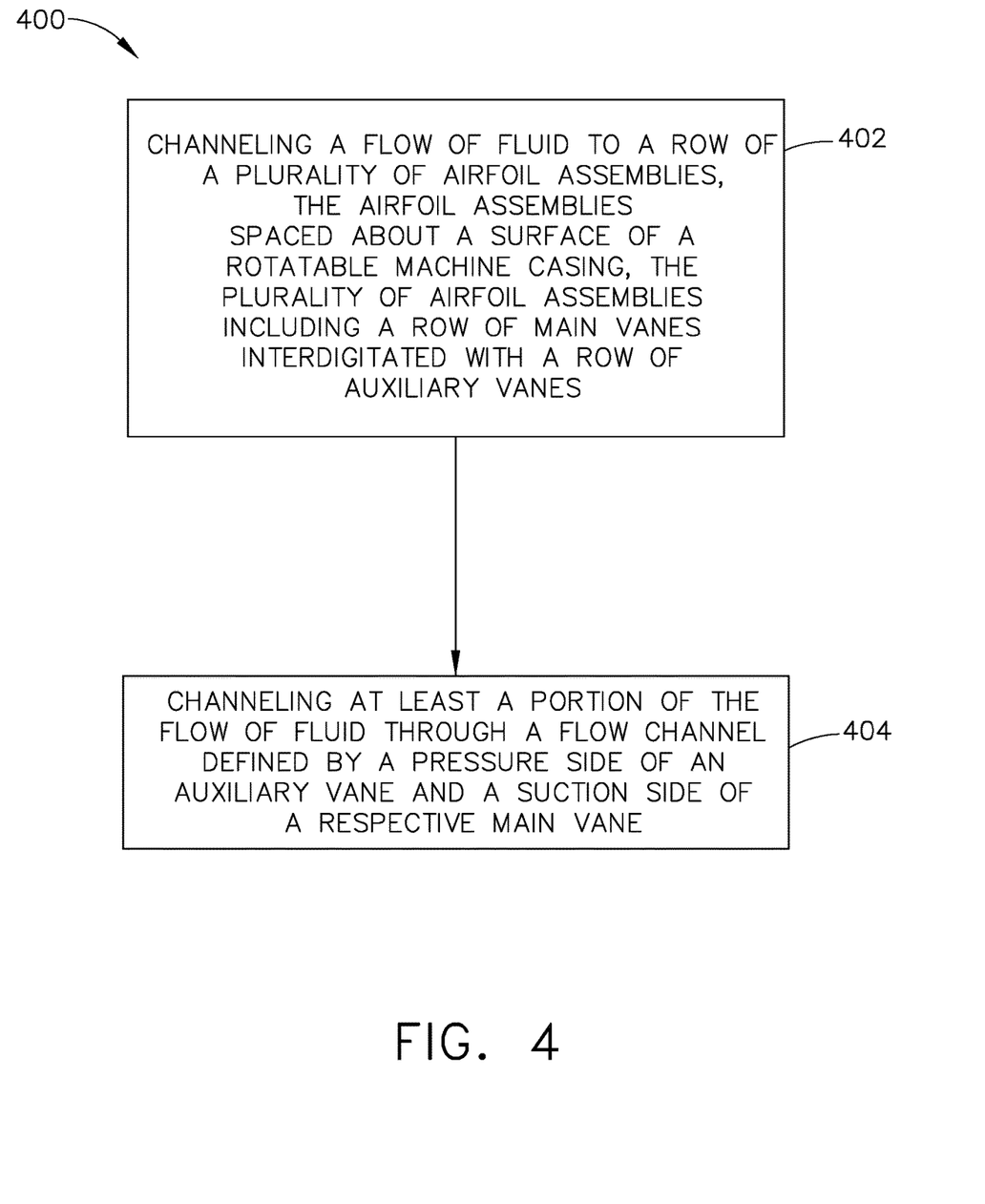
FIG. 4 is a flow chart of a method of managing negative incidence of an airfoil.

FIG. 4 is a flow chart of a method 400 of managing negative incidence of a rotatable member blade. In the example embodiment, method 400 includes channeling 402 a flow of fluid to a row of a plurality of vanes coupled to a surface of a stationary casing member. The plurality of vanes are spaced circumferentially about the surface of the stationary casing member. Each vane of the plurality of vanes including a row of main vanes interdigitated with a row of auxiliary vanes. Method 400 also includes channeling 404 at least a portion of the flow of fluid through a channel defined by a pressure side of the auxiliary vanes and a suction side of the main vanes.

The above-described vanes, rotatable machines, and method provide an efficient technique for managing incidence in bladed rotatable machines, particularly stationary casing members of fans, guide vanes, turbines and compressors of the kind used in rotatable machines, gas compressor machines and the like. Specifically, the above-described incidence management system includes a row of auxiliary vanes interdigitated with a row of main vanes to form a stage of the machine. A flow channel formed between the auxiliary vane and main vane pulls incoming flow around the auxiliary vane, between the auxiliary vane and main vane to prevent or reduce bluff body flow separation on the pressure side of the main vane.

The above-described embodiments of a method and apparatus for managing incidence in a stationary casing member provides a cost-effective and reliable means for passive improvement of incidence over a wide range of machine operating conditions. More specifically, the methods and apparatus described herein facilitate maintaining a less negative angle of incidence on the main vanes of the machine than would otherwise be expected. As a result, the methods and apparatus described herein facilitate improving performance, efficiency, and operability of the machine, in addition to increasing a life of the machine in a cost-effective and reliable manner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A row of airfoil vane pairs comprising:
   a first row of main vanes extending radially inwardly from a stationary casing member and spaced circumferentially about a first axial location of said stationary casing member, each main vane of said first row of main vanes being maintained at an angle of incidence less than or equal to twenty degrees, each main vane comprising a vane root coupled to said stationary casing member, a distal tip end, and a main airfoil extending therebetween, said airfoil comprising a first height from the stationary casing member to the distal tip end, a first chord length between a leading edge of said main airfoil and a trailing edge of said main airfoil, and a thickness;

a second row of auxiliary vanes, upstream of the first row of main vanes, extending radially inwardly from said stationary casing member and spaced circumferentially about a second axial location of said stationary casing member, said second axial location is different from said first axial location, each auxiliary vane of said second row of auxiliary vanes comprising an auxiliary vane root coupled to said stationary casing member, a distal tip end, and an auxiliary airfoil extending therebetween, said auxiliary airfoil comprising a second height from the stationary casing member to said distal tip end, a second chord length between a leading edge of said auxiliary airfoil and a trailing edge of said auxiliary airfoil, and a thickness, wherein the second chord length is less than the first chord length; and a flow channel defined between a pressure side of an auxiliary vane of said second row of auxiliary vanes and a suction side of an adjacent main vane of said first row of main vanes proximate said leading edge of said main airfoil of said adjacent main vane.

2. The row of airfoil vane pairs of claim 1, wherein said flow channel extends between said pressure side of said auxiliary vane of said second row of auxiliary vanes and said suction side of said adjacent main vane of said first row of main vanes from said leading edge of said main airfoil to said trailing edge of said auxiliary airfoil.

3. The row of airfoil vane pairs of claim 1, wherein said flow channel extends between said pressure side of said auxiliary vane of said second row of auxiliary vanes and said suction side of said main vane of said first row of main vanes from said leading edge of said main airfoil to a point forward of a local maximum thickness of said main airfoil.

4. The row of airfoil vane pairs of claim 1, wherein said leading edge of said auxiliary airfoil is positioned axially forward of said leading edge of said main airfoil.

5. The row of airfoil vane pairs of claim 1, wherein said stationary casing member comprises a rotor assembly comprising at least one of a high pressure compressor rotor assembly, and a fan assembly.

6. The row of airfoil vane pairs of claim 1, wherein said row of airfoil vane pairs forms a later stage of a compressor.

7. The row of airfoil vane pairs of claim 1, wherein said second height is equal to said first height.

8. The row of airfoil vane pairs of claim 1, wherein said second height is less than said first height.

9. A method of managing negative incidence of a vane, said method comprising: channeling a flow of fluid to a row of a plurality of airfoil assemblies, the plurality of airfoil assemblies spaced circumferentially about a surface of a stationary casing member, the plurality of airfoil assemblies including a row of main vanes interdigitated with a row of auxiliary vanes wherein the row of auxiliary vanes is positioned upstream of the row of main vanes, and wherein an auxiliary vane of the row of auxiliary vanes has a chord length less than a chord length of a main vane of the row of main vanes; and channeling at least a portion of the flow of fluid through a flow channel defined by a pressure side of an auxiliary vane of the row of auxiliary vanes and a suction side of a respective main vane of the row of main vanes; and maintaining an angle of incidence on the main vanes less than or equal to twenty degrees using the flow of fluid.

10. The method of claim 9, further comprising channeling the flow of fluid along the pressure side of the auxiliary vane before the flow of fluid enters the flow channel.

11. The method of claim 9, further comprising maintaining a predetermined angle of incidence on the main vanes using the flow of fluid.

12. The method of claim 9, further comprising maintaining an angle of incidence on the main vanes less than or equal to sixty degrees using the flow of fluid.

13. The method of claim 9, further comprising maintaining a non-negative angle of incidence on the main vanes using the flow of fluid.

14. A rotatable machine comprising: a rotor assembly comprising one or more bladed members coupled through one or more shafts rotatable about a longitudinal axis; a stationary casing member at least partially surrounding said rotor assembly; a plurality of vane pairs spaced circumferentially about a first axial location of at least one of said stationary casing member and said rotor assembly, each of a main vane and an adjacent auxiliary vane of said plurality of vane pairs comprising a leading edge, a trailing edge, and an airfoil body extending therebetween, each said airfoil body comprising a suction side and an opposing pressure side, wherein the auxiliary vane is positioned upstream of the main vane and has a chord length less than a chord length of the main vane, each main vane being maintained at an angle of incidence less than or equal to twenty degrees; and a low channel defined between a pressure side of said airfoil body of said adjacent auxiliary vane and a suction side of said airfoil body of said main vane proximate said leading edge of said main vane.

15. The rotatable machine of claim 14, wherein said flow channel extends between said pressure side of said auxiliary vane airfoil body and said suction side of said main vane airfoil body from said leading edge of said main vane to said trailing edge of said adjacent auxiliary vane.

16. The rotatable machine of claim 14, wherein said flow channel extends between said pressure side of said auxiliary vane airfoil body and said suction side of said main vane airfoil body from said leading edge of said main vane to a point forward of a local maximum thickness of said main vane airfoil body.

17. The rotatable machine of claim 14, wherein said leading edge of said main vane is positioned axially forward of said trailing edge of said adjacent auxiliary vane.

18. The rotatable machine of claim 14, wherein said rotor assembly comprises at least one of a high pressure compressor, and a fan assembly.

19. The rotatable machine of claim 14, wherein said plurality of vane pairs form a later stage of a compressor.

* * * * *